INVENTOR
Clifford H. Fry
BY *J. Hanson Boyden*,
ATTORNEY

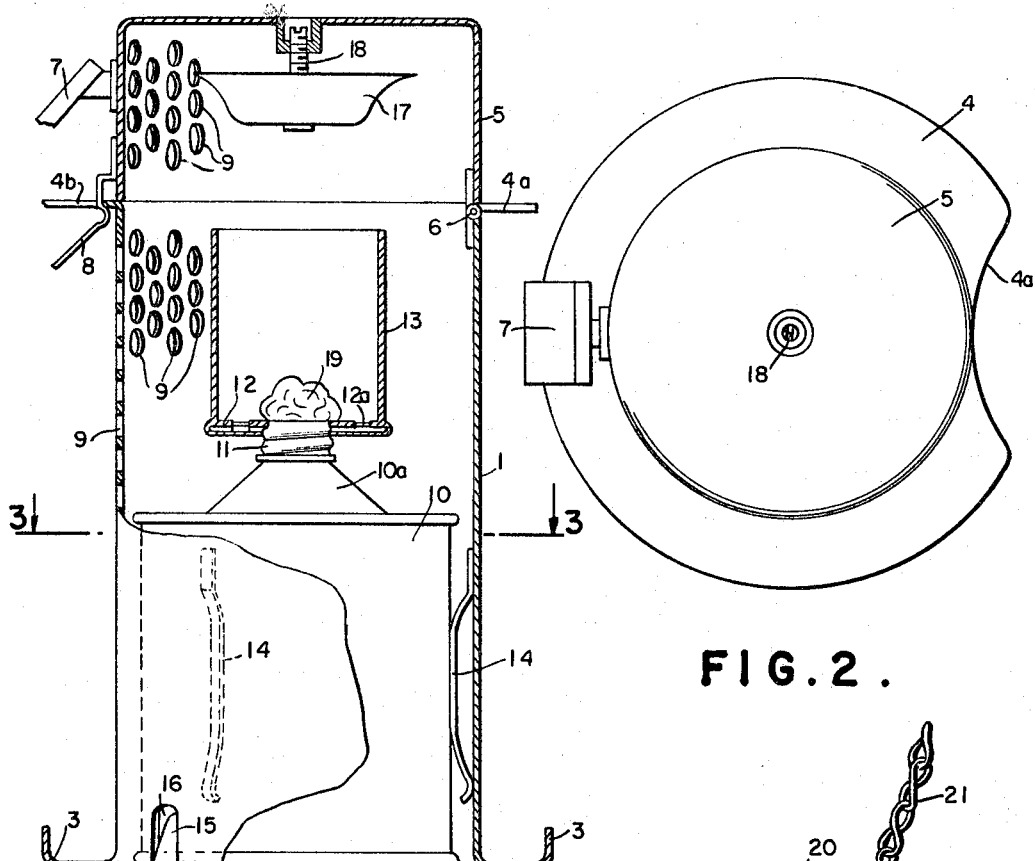
FIG.1.
FIG.2.
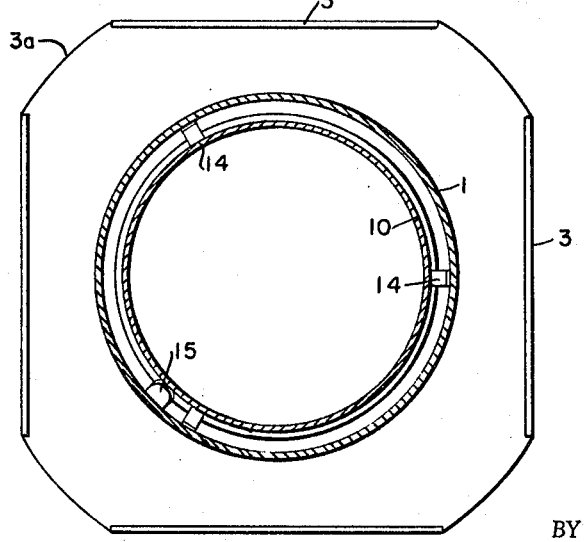
FIG.3.
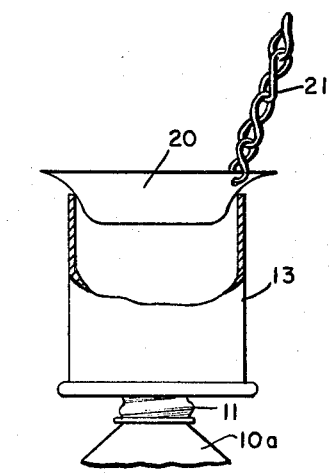
FIG.6.
INVENTOR
Clifford H. Fry
BY J. Hanson Boyden,
ATTORNEY May 7, 1968 C. H. FRY 3,381,678
ALCOHOL HEATING AND COOKING STOVE
Filed Oct. 8, 1965 3 Sheets-Sheet 2

May 7, 1968 C. H. FRY 3,381,678
ALCOHOL HEATING AND COOKING STOVE
Filed Oct. 8, 1965 3 Sheets-Sheet 3
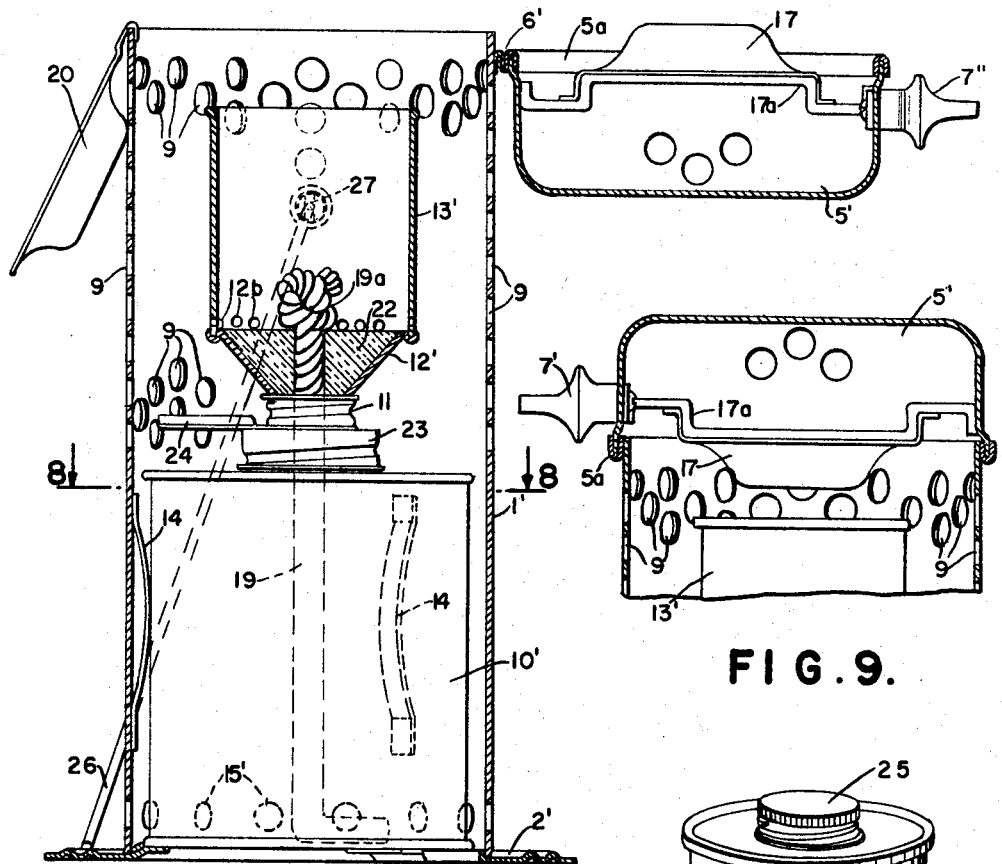
FIG. 7.
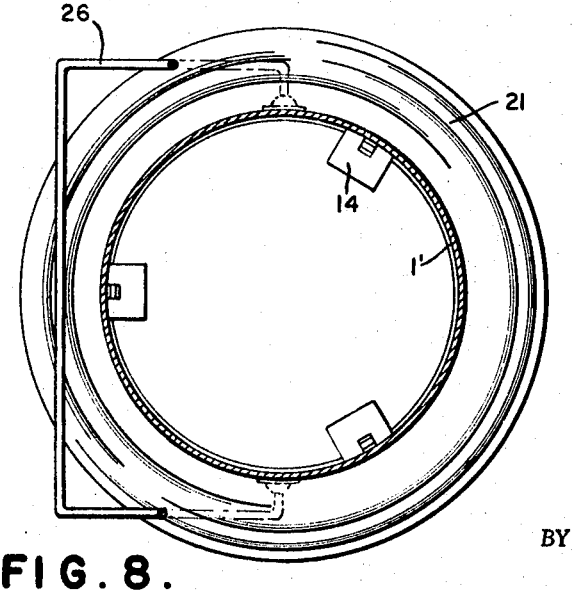
FIG. 8.
FIG. 9.
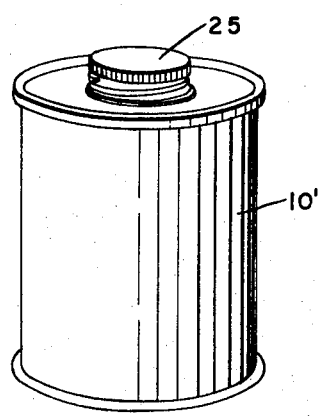
FIG. 10.
INVENTOR
Clifford H. Fry
BY J. Hanson Boyden,
ATTORNEY United States Patent Office 3,381,678
Patented May 7, 1968

3,381,678
ALCOHOL HEATING AND COOKING STOVE
Clifford H. Fry, Tucson, Ariz., assignor to Umco Corporation, Watertown, Minn., a corporation of Minnesota
Filed Oct. 8, 1965, Ser. No. 494,132
6 Claims. (Cl. 126—4)

ABSTRACT OF THE DISCLOSURE

An alcohol-burning combined heating and cooking stove having a casing made in two sections hinged together at a point above the burner, so that when the upper section is swung over on its pivot through 180°, its side rests against the side of the lower section, and the top edges of both sections lie in substantially the same plane to support a cooking utensil. Also the commercial can in which the fuel is solid is inserted in the stove in place of any special fuel container, so that the necessity of pouring fuel from one container to another is avoided.

---

This invention relates to stoves of the fluid fuel type, and more particularly to a stove using alcohol as fuel.

One object of the invention is to devise a stove of this nature which may be used either as an air or space heater, or as a cooking stove.

A subsidiary object is to so construct the stove that, when used as an air or space heater the burner flame is completely enclosed or covered, but when used as a cooking stove, the cooking utensil is exposed directly to the heat of the flame without any intervening metal.

A further and general object of the invention is to provide a combined heating and cooking alcohol stove particularly suitable for the use of campers, and to this end the stove is of simple but rugged construction, light in weight, and well adapted to be readily transported from place to place.

Yet another object is to devise an arrangement of parts whereby the original can in which the fuel is purchased is used as the fuel container in the stove, so that the necessity of transferring fuel from one container to another is avoided, and when one can of fuel is exhausted, the can may be discarded, and a new full one substituted.

With the above and other objects in view, and to improve generally on the details of such equipment, the invention consists in the construction, combination and arrangement of parts hereinafter described and claimed, and illustrated in the accompanying drawings, forming part of this specification and in which:

FIG. 1 is a vertical section through one form of the stove, complete, parts being in elevation, and parts being broken away, the parts being shown in the position they occupy when the stove is used for heating air;

FIG. 2 is a plan view of the top of the stove shown in FIG. 1;

FIG. 3 is a transverse section substantially on the line 3—3 of FIG. 1, looking in the direction of the arrows;

FIG. 6 is a side elevation of the combustion chamber and associated parts, parts being broken away, this FIG. 6 showing the snuffer for extinguishing the flame;

FIG. 7 is a vertical section similar to FIG. 1, but showing a modified construction of stove, and illustrating the top of the stove open to receive a cooking utensil, as in FIG. 5;

FIG. 8 is a horizontal section, substantially on the line 8—8 of FIG. 7, looking in the direction of the arrows, the fuel container being omitted;

FIG. 9 is a fragmentary vertical section through the upper part of the stove illustrated in FIG. 7, but showing the top of the stove closed, as in FIG. 1; and FIG. 10 is a perspective view of the preferred form of the can or container in which the fuel is sold.

Figure 4:
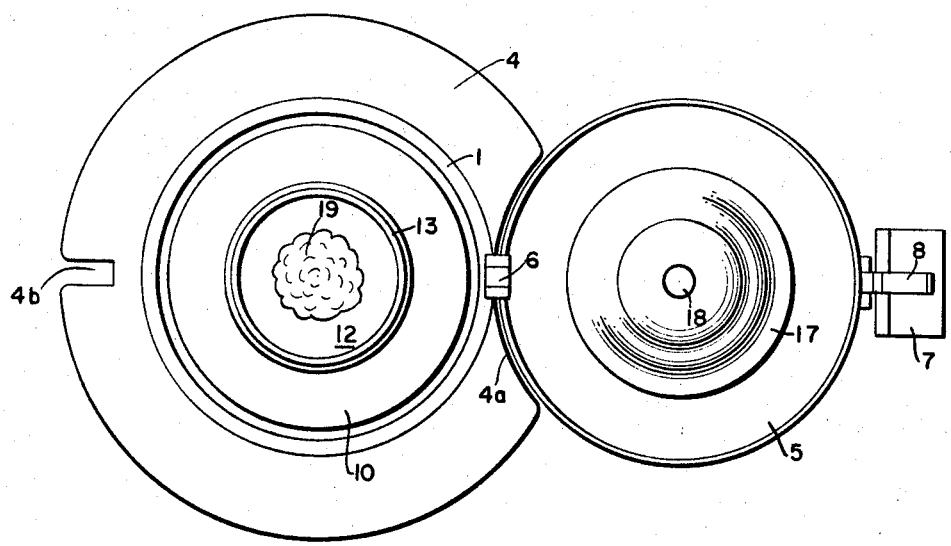
FIG. 4 is a plan view, of the stove with the top section shown as swung to open position for cooking.

Referring to the drawings in detail, my improved stove comprises an upright, sheet metal casing, shown as cylindrical, having a lower section 1 supported on a flat base or bottom 2. This base or bottom 2 is preferably formed from a circular sheet having segments turned up along straight lines to provide a plurality of spaced, upstanding flanges 3, having curved upper edges. These flanges are separated by arcuate portions 3ª, as best shown in FIG. 2. This produces a base of substantially polygonal shape, having straight sides. The object of this is to reduce the tendency to roll, when the stove is laid on its side, as for transportation purposes.

Around the upper edge of the lower section 1 is a radially projecting, horizontally extending flange 4. This flange has a portion at one side cut away in an arc, as shown at 4ª in FIG. 2. Hinged to the top edge of the lower section of the stove 1 by a horizontal pivot 6 is an upper cylindrical section 5, of the same diameter. A handle 7 of non-heat-conducting material is secured to the section 5 at a point opposite the pivot 6, and a spring latch 8 is also secured to the section 5 and engages in a notch 4ᵇ in the flange 4, to hold the upper section in position. This upper section 5, as well as the upper portion of the lower section 1, is foraminous, that is, formed with numerous perforations 9 to permit circulation of air and gases.

The lower portion of the lower section 1 is preferably imperforate, and in it is removably housed a separately fabricated fuel container 10. This is supported on the flat bottom or base 2, as clearly illustrated in FIG. 1, and is shown as formed with a conical top portion 10ª provided with a removable screw cap 11. This container 10 is the original can in which the fuel is sold. A cylindrical combustion chamber 13, having an open top, and a bottom 12, provided with air holes 12ª, is supported on the fuel container 10. It will be noted that the pivot 6 and upper edge of the lower section 1 of the stove casing are located a substantial distance above the top of the burner or combustion chamber 13. Preferably, and as shown, the screw cap 11 is permanently secured to the bottom 12 of the combustion chamber as by welding. The screw cap and bottom have registering openings therein, and through the openings a suitable wick passes down from the combustion chamber 13 into the fuel container 10, as indicated at 19 in FIG. 1. The preferred type of wick and other details of the burner are set forth in my prior co-pending Patent No. 3,293,888, issued Dec. 27, 1966.

The fuel can, when purchased, is provided with a removable screw cap which is interchangeable with the screw cap 11, secured to the combustion chamber. Thus, when a can of fuel is purchased, it is only necessary to remove the original cap and screw the cap 11, carrying the wick and combustion chamber, on to the threaded nipple of the can. In this way, there is no occasion for transferring fuel from the commercial can to any special container, and all danger of spilling the fuel is thus avoided.

As shown in FIGS. 1 and 3, the fuel container 10 is spaced from the walls of the casing by means of spring slips 14, to provide an annular space between such walls and the sides of the container. To admit air to this space, I punch out one or more tongues 15 from the sides of the casing near the bottom, forming openings 16 through which air may enter and flow upwardly around the fuel container, thus serving to prevent it from becoming excessively hot.

Suspended from the top of the upper section 5, immediately above the combustion chamber 13, is an inverted-bell-shaped baffle or spreader 17, the purpose of which is to deflect the heat laterally, and direct it outwardly through the perforations 9. This baffle is supported by a screw 18, by means of which it may be vertically adjusted.

A similar inverted-bell-shaped piece 20 (FIG. 6) is used as a snuffer. It is attached to a chain 21, and by opening the upper section 5, this snuffer may be placed by the chain on the top of the combustion chamber, thus closing it, and extinguishing the flame. Snuffer 20 closes top of combustion chamber and eliminates evaporation of alcohol from wick when not in use.

FIG. 1 shows the stove as it appears when used for air and space heating. In this position of the parts, it will be seen that the combustion chamber and flame are wholly enclosed by the metal casing.

Figure 5:
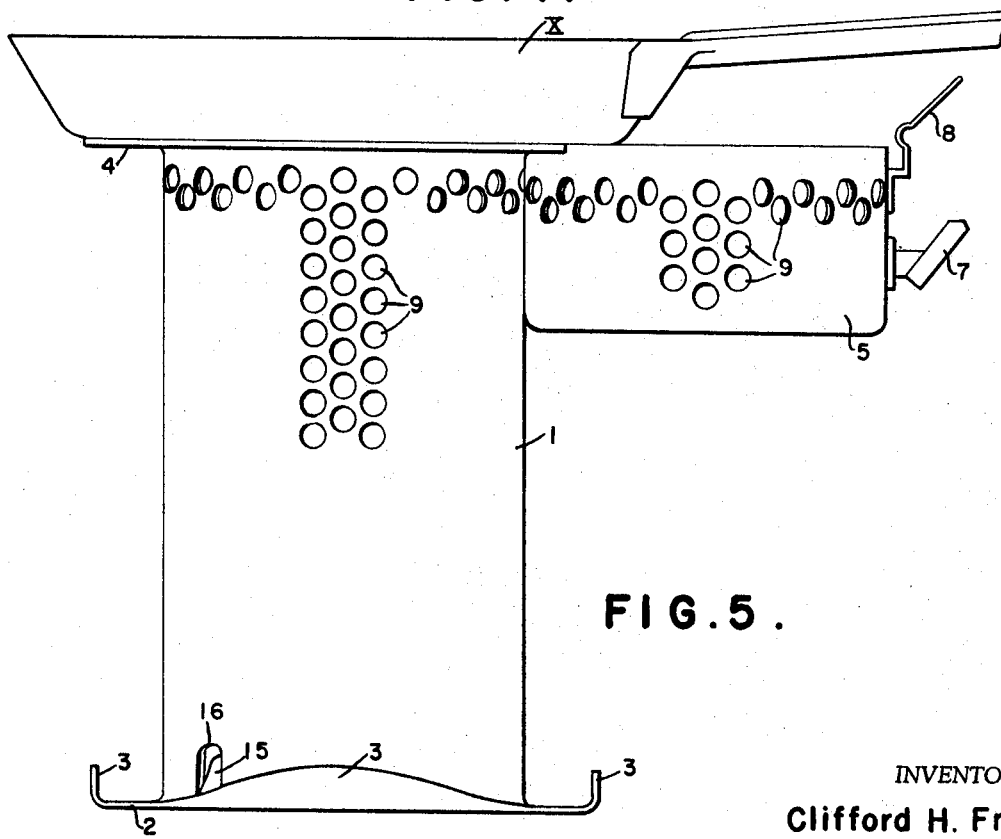
FIG. 5 is a side elevation of the stove with the top section swung to open position as in FIG. 4, this FIG. 5 also showing a cooking utensil in operative position on the stove.

When it is desired to use the stove for cooking, the latch 3 is released and the upper section 5 swung over about its pivot 6 through approximately 180°, into the position shown in FIGS. 4 and 5. A cooking utensil such as a frying pan X may then be placed on the open top of the lower section 1, where it is supported by the wide radial flange 4, and where it is exposed directly to the full heat of the flame.

Moreover, the upper section 5 is so designed that when swung over to the position shown in FIGS. 4 and 5, its upper edge lies substantially in the plane of the flange 4 and upper edge of section 1, and its side rests against the side of section 1. It will be further noted that the curved edge of section 5 is received in the arcuate cut away 4ᵃ of the flange 4, and this lends lateral stability to the section 5. It will be seen that the combination of the two sections, with their top edges lying adjacent each other in the same plane, provides a greatly increased area for supporting cooking utensils.

In FIGS. 7 to 10 inclusive, I have shown a stove of the same type, but differing slightly in construction.

The base, instead of having turned up edges, is flat and circular, as shown at 2′, and preferably is formed with concentric corrugations.

The radial flange 4ᵃ, of FIG. 1, is omitted from this modification, and a bead 5ᵃ is applied to the edge of the top section 5′, as shown in FIGS. 7 and 9. The spreader 17, instead of being adjustable as in FIG. 1, is carried by a fixed bracket 17ᵃ, as illustrated in FIGS. 7 and 9.

The top section 5′ is attached to the main section by a hinge 6′, and when in the position shown in FIG. 7 a cooking utensil may be supported on the main section, the same as illustrated in FIG. 5. The top section is manipulated by means of the handle 7′.

The combustion chamber 13′, instead of having a flat bottom, as in FIG. 1, is formed with an inverted conical bottom portion 12′, to which the screw cap 11 is secured. Air holes 12ᵇ are formed around the bottom of the combustion chamber.

A wick 19, shown as having a knot 19ᵃ at its upper end, as in my said prior patent passes downwardly through the inverted conical portion 12′, and through registering openings in the cap 11, and another, and preferably larger, cap 23. The two caps 11 and 23 are rigidly and permanently secured together, in reverse, as by welding, and a radially extending turn lever 24 is rigidly attached to the cap 23.

Inside the inverted conical portion 12′ through which the wick extends is placed a mass of fireproof cement, such as fire clay, which completely surrounds the wick below the knot, and in which the wick is firmly embedded. This constitutes a seal which prevents rapid leaking, should the stove or fuel container be tipped over.

In FIG. 10 I have illustrated a common form of can 10′ in which the alcohol fuel is packaged for sale. This can has a flat top, and is closed by a screw cap 25, fitting over a threaded nipple. The screw caps 23 and 25 are identical and interchangeable.

From the foregoing it will be understood that the combustion chamber 13′, conical bottom 12′ and cement filling 22, wick 19 and the permanently connected screw caps 11 and 23 all constitute a unit which is removable as a whole from the fuel can 10′. When the fuel becomes exhausted, all that is necessary is to obtain a new can, such as shown in FIG. 10, remove the screw cap 25, and screw onto the threaded nipple the cap 23 of the above-described unit, inserting the wick down into the new can. The old can may then be discarded. It will be particularly noted that there is no pouring of fuel from one container to another.

This substitution of a full can for an empty one can most easily be effected by making the change while the parts are outside the stove. After the combustion chamber unit has been assembled with the full can, the assembly may be placed in position in the stove through the top thereof, when the top is open as shown in FIG. 7. As illustrated in this figure, the snuffer 20, previously described in connection with FIG. 6, may be conveniently hung on the side of the stove when not in use.

A carrying handle 26 for the stove may be pivoted to the casing at 27, as shown in FIG. 7.

While in FIG. 1 I have shown a combustion chamber having a flat bottom, and a fuel can having a conical top, and in FIG. 7 I have shown a combustion chamber having an inverted conical bottom and a fuel can having a flat top, the principle is the same in both, namely, that the combustion chamber unit includes a screw cap fitting a threaded nipple on the can, and is thus wholly supported on the can, and removable therefrom.

What I claim is:

1. An alcohol stove comprising a generally cylindrical casing having a flat bottom, a cylindrical fuel container removably mounted in said casing and supported on said bottom, said container having at its top a threaded nipple, a screw cap removably engaging said nipple, an open top combustion chamber having fixed to its lower end another screw cap, said two caps being rigidly and permanently united in reverse, so that said combustion chamber is supported thereby on said fuel container, said two caps having central registering openings, and a wick extending downwardly through said openings from said combustion chamber into said fuel container.

2. An alcohol stove in accordance with claim 1, in which the lower end of said combustion chamber is of inverted conical shape, and in which the wick is surrounded by and embedded in a mass of fireproof cement, substantially filling said inverted conical portion.

3. An alcohol stove in accordance with claim 1 in which the fuel container is a commercial can in which the fuel is sold, in which the screw cap removably engaging said nipple is a conventional closure cap forming part of said can when sold, and in which the screw cap fixed to said combustion chamber fits said nipple interchangeably with said closure cap, whereby, when said closure cap is removed from said container, the wick may be inserted therein, and said screw cap, carrying the combustion chamber, screwed on to said nipple, in place of said closure cap, thus making it unnecessary to transfer the fuel from the commercial container to a special container for burning.

4. An alcohol stove comprising a casing, a fuel container removably mounted in said casing, a screw cap closing the upper end of said container, a combustion chamber, said combustion chamber having at its lower end an inverted conical portion rigidly secured to said screw cap, said conical portion and cap having central registering openings, a wick passing downwardly from said combustion chamber through said openings into said container, and a mass of fireproof cement filling said conical portion around said wick, and serving to anchor said wick in position.

5. An alcohol stove comprising a generally cylindrical casing made up of two normally coaxial sections, a burner housed within the lower section, the top of said lower section being completely open and unobstructed, said upper section being hinged at its lower edge to said lower section by a horizontal pivot at a point spaced a substantial distance above said burner, so that said upper section may swing through approximately 180°, the walls of said lower section being perforated over the area between the upper edge thereof and the top of said burner to provide air for combustion, whereby, when the upper section is thus swung out of the way, a cooking utensil may be supported on the upper edge of the said lower section above and out of contact with the burner, and exposed directly to the heat of the flame.

6. A stove in accordance with claim 5, in which the upper section is so constructed that, when it is swung over, its side rests against the side of the lower section and its upper edge lies substantially in the same plane as the upper edge of the lower section, thereby providing a broad area on which a cooking utensil may be supported.

References Cited
UNITED STATES PATENTS

| | | | |
|---|---|---|---|
| 715,836 | 12/1902 | Morss | 126—96 |
| 1,534,897 | 4/1925 | Bloomquist | 126—93 |
| 1,730,253 | 10/1929 | Thesen | 126—43 |
| 1,987,487 | 1/1935 | Moore | 126—93 |
| 2,088,797 | 8/1937 | Larsen | 126—43 |
| 2,357,575 | 9/1944 | Benz | 126—93 |
| 2,433,829 | 1/1948 | Doering | 126—96 |

CHARLES J. MYHRE, *Primary Examiner.*